United States Patent
Zhu et al.

(10) Patent No.: US 12,082,233 B2
(45) Date of Patent: Sep. 3, 2024

(54) RESOURCE SCHEDULING METHOD AND RELATED DEVICE

(71) Applicant: HUAWEI TECHNOLOGIES CO., LTD., Shenzhen (CN)

(72) Inventors: Yutang Zhu, Xi'an (CN); Shengchao Deng, Shanghai (CN); Longke He, Shenzhen (CN); Hui Gao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 308 days.

(21) Appl. No.: 17/698,036

(22) Filed: Mar. 18, 2022

(65) Prior Publication Data

US 2022/0210799 A1  Jun. 30, 2022

Related U.S. Application Data

(63) Continuation of application No. PCT/CN2020/108130, filed on Aug. 10, 2020.

(30) Foreign Application Priority Data

Sep. 18, 2019  (CN) .......................... 201910882641.7

(51) Int. Cl.
*H04W 72/542* (2023.01)
*H04L 5/00* (2006.01)
*H04W 72/044* (2023.01)

(52) U.S. Cl.
CPC ......... *H04W 72/542* (2023.01); *H04L 5/0048* (2013.01); *H04W 72/046* (2013.01)

(58) Field of Classification Search
CPC .............. H04W 72/542; H04W 72/046; H04L 5/0048; H04L 5/001; H04B 7/0452; H04B 7/0456; H04B 7/0617; H04B 7/0695

See application file for complete search history.

(56) References Cited

U.S. PATENT DOCUMENTS

| 2013/0329664 | A1* | 12/2013 | Kim ...................... H04W 24/10 370/329 |
| 2014/0098689 | A1* | 4/2014 | Lee ....................... H04W 24/08 370/252 |
| 2016/0353467 | A1 | 12/2016 | Nekovee |
| 2018/0054235 | A1 | 2/2018 | Liang et al. |

(Continued)

FOREIGN PATENT DOCUMENTS

| CN | 107431512 A | 12/2017 |
| CN | 107835042 A | 3/2018 |
| CN | 107948987 A | 4/2018 |
| CN | 108024322 A | 5/2018 |

(Continued)

OTHER PUBLICATIONS

Xinwei, "Views on NR Reference Signals for Beam and CSI measurement," 3GPP TSG RAN WG1 Meeting #86b , Lisbon, Portugal, R1-1609695, total 6 pages, 3rd Generation Partnership Project, Valbonne, France (Oct. 10-14, 2016).

(Continued)

*Primary Examiner* — Dady Chery
(74) *Attorney, Agent, or Firm* — Leydig, Voit & Mayer, Ltd.

(57) ABSTRACT

A resource scheduling method and a related device configure a scheduled resource for a terminal device based on a dynamic analog beam determined by a network device, thereby increasing a throughput of the terminal device. The network device determines, based on information about an SRS of each first terminal device, a set of second terminal devices from a set of first terminal devices and static analog beam information of each second terminal device in the set of second terminal devices. Then, the network device determines beam domain channel information based on the static analog beam information. As such, the network device determines dynamic analog beam information of each sec- (Continued)

ond terminal device based on the static analog beam information and the beam domain channel information.

15 Claims, 4 Drawing Sheets

(56) References Cited

U.S. PATENT DOCUMENTS

| | | | |
|---|---|---|---|
| 2018/0375557 A1 | 12/2018 | Noh et al. | |
| 2019/0260459 A1* | 8/2019 | Jeon | H04B 7/088 |
| 2021/0367740 A1* | 11/2021 | Chen | H04L 1/1854 |

FOREIGN PATENT DOCUMENTS

| | | |
|---|---|---|
| CN | 108207030 A | 6/2018 |
| CN | 109219062 A | 1/2019 |
| CN | 109831823 A | 5/2019 |
| CN | 110226301 A | 9/2019 |
| WO | 2016065644 A1 | 5/2016 |
| WO | 2018071026 A1 | 4/2018 |

OTHER PUBLICATIONS

Catt, "SRS Power Control In Multi-Beam Configuration," 3GPP TSG RAN WG1 Meeting #89, Hangzhou, China, R1-1707531, total 6 pages, 3rd Generation Partnership Project, Valbonne, France (May 15-19, 2017).

Huawei, HiSilicon, "Beam measurement and reporting using L1-SINR," 3GPP TSG AN WG1 Meeting #96bis, Xi'an, China, R1-1903976, total 7 pages, 3rd Generation Partnership Project, Valbonne, France (Apr. 8-12, 2019).

LG Electronics, "Discussion on beam setting for control channel and data channel," 3GPP TSG RAN WG1 Meeting #88, Athens, Greece, R1- 1702452, total 5 pages, 3rd Generation Partnership Project, Valbonne, France (Feb. 13-17, 2017).

"TRP-to-TRP measurement for cross-link interference mitigation," 3GPP TSG RAN WG1 Meeting #89, Hangzhou, China, R1-1706910, Total 5 pages, 3rd Generation Partnership Project, Valbonne, France (May 15-19, 2017).

"Beamforming Gain for Spatial Channels with Angular Spread," 3GPP TSG RAN WG1 NR AH#3, Nagoya, Japan, R1-1715975, Total 5 pages, 3rd Generation Partnership Project, Valbonne, France (Sep. 18-21, 2017).

* cited by examiner

RESOURCE SCHEDULING METHOD AND RELATED DEVICE

CROSS-REFERENCE TO RELATED APPLICATIONS

This application is a continuation of International Application No. PCT/CN2020/108130, filed on Aug. 10, 2020, which claims priority to Chinese Patent Application No. 201910882641.7, filed on Sep. 18, 2019. The disclosures of the aforementioned applications are hereby incorporated by reference in their entireties.

TECHNICAL FIELD

Embodiments of this application relate to the communications field, and in particular, to a resource scheduling method and a related device.

BACKGROUND

In a communications system, when a radio signal is transmitted, transmitted energy can be concentrated in a specific direction through beamforming, so that transmit power in the specific direction is increased, and transmit power in other directions is close to zero. In this way, a communications distance in a desired direction is extended, and interference to other directions is avoided.

In a conventional technology, a network device selects a static analog beam that matches a channel from a limited static analog beam set for radio resource scheduling and transmission.

In such a solution, static analog beams that can be selected by the network device are limited, and there is a large gap between the static analog beams that can be selected. Therefore, a static analog beam selected by the network device usually does not match the channel. As a result, effects of radio resource scheduling and transmission performed using the static analog beam are not desirable.

SUMMARY

Embodiments of this application provide a resource scheduling method, to increase a throughput of data transmission between a network device and a terminal device.

According to a first aspect, an embodiment of this application provides a resource scheduling method. In the method, the network device measures a sounding reference signal (SRS) of each first terminal device in a set of first terminal devices, to obtain information about the SRS of each first terminal device. Then, the network device determines, based on the information about the SRS of each first terminal device, a set of second terminal devices from the set of first terminal devices and static analog beam information of each second terminal device in the set of second terminal devices. The network device determines beam domain channel information based on the static analog beam information. Then, the network device determines dynamic analog beam information of each second terminal device based on the static analog beam information and the beam domain channel information. Finally, the network device configures a dynamic analog beam for the second terminal device based on the dynamic analog beam information.

It should be noted that the static analog beam information is used to indicate N static analog beams matching the second terminal device, and N is an integer greater than or equal to 1. The beam domain channel information is used to indicate channel quality of N channels between the network device and the second terminal device, and the N static analog beams are in a one-to-one correspondence with the N channels. The dynamic analog beam information is used to indicate a dynamic analog beam available to the second terminal device.

In this embodiment of this application, the network device determines, based on the static analog beam information of the second terminal device and the beam domain channel information of the second terminal device, a dynamic analog beam available to each second terminal device, and configures the dynamic analog beam for the second terminal device based on the dynamic analog beam information. The beam domain channel information of the second terminal device can reflect channel quality between the terminal device and the network device, and the static analog beam information of the second terminal device can reflect an existing static analog beam near the terminal device. Therefore, the dynamic analog beam determined based on the static analog beam information and the beam domain channel information better matches a channel of the second terminal device, thereby increasing a throughput of the second terminal device.

According to the first aspect, in a first implementation of the first aspect of embodiments of this application, the information about the SRS includes a signal to interference plus noise ratio (SINR) value of the SRS. That the network device determines, based on the information about the SRS of each first terminal device, a set of second terminal devices from the set of first terminal devices and static analog beam information of each second terminal device in the set of second terminal devices includes: The network device determines, from the set of first terminal devices, that a first terminal device whose SINR value of the SRS is greater than a first preset value is a second terminal device, to obtain the set of second terminal devices; and the network device determines static analog beam information of the second terminal device.

In this implementation, a manner of determining the second terminal device is specified. Because the information about the SRS includes the signal to interference plus noise ratio SINR value of the SRS, the network device may select, based on the SINR value of the SRS, a second terminal device that meets a condition.

According to the first aspect, in a second implementation of the first aspect of embodiments of this application, the information about the SRS includes a signal to interference plus noise ratio (SINR) value of the SRS. The method further includes: The network device obtains a moving speed of each first terminal device in the set of first terminal devices. That the network device determines, based on the information about the SRS of each first terminal device, a set of second terminal devices from the set of first terminal devices and static analog beam information of each second terminal device in the set of second terminal devices includes: The network device determines, from the set of first terminal devices, that a first terminal device whose SINR value of the SRS is greater than a first preset value and whose moving speed is less than a second preset value is a second terminal device, to obtain the set of second terminal devices; and the network device determines static analog beam information of the second terminal device.

In this implementation, another manner of determining the second terminal device is provided. In addition to the SINR value of the SRS, the moving speed of the first terminal device should be considered. Therefore, this helps improve accuracy of determining the second terminal device.

According to the first aspect, the first implementation of the first aspect, and the second implementation of the first aspect, in a third implementation of the first aspect of embodiments of this application, the static analog beam information includes N static analog beam weights, and the N static analog beam weights are in a one-to-one correspondence with the N static analog beams. The beam domain channel information includes an SRS beam domain channel matrix. That the network device determines dynamic analog beam information of each second terminal device based on the static analog beam information and the beam domain channel information includes: The network device calculates an SRS beam domain channel covariance matrix of each second terminal device based on the SRS beam domain channel matrix of each second terminal device; the network device calculates an SRS fullband beam domain channel covariance matrix based on the SRS beam domain channel covariance matrix of the second terminal device; and the network device calculates a dynamic analog weight based on an eigenvector of the SRS fullband beam domain channel covariance matrix, where the dynamic analog weight is used to indicate a dynamic analog beam available to the second terminal device.

In this implementation, an exemplary implementation of calculating the dynamic analog weight of the second terminal device is provided. Because the dynamic analog weight is calculated based on a "maximum SINR criterion", it can be ensured that the terminal device can obtain a highest throughput under the calculated dynamic analog weight.

According to the third implementation of the first aspect, in a fourth implementation of the first aspect of embodiments of this application, that the network device configures a dynamic analog beam for the second terminal device based on the dynamic analog beam information includes: The network device calculates a correlation coefficient between dynamic analog weights of at least two second terminal devices in the set of second terminal devices based on the dynamic analog weight of each second terminal device in the set of second terminal devices, where the correlation coefficient is used to indicate correlation between the dynamic analog weights of the at least two second terminal devices; and the network device configures a dynamic analog beam for the at least two second terminal devices based on the correlation coefficient between the dynamic analog weights of the at least two second terminal devices.

In this implementation, the network device may allocate a dynamic analog beam to at least two terminal devices based on a correlation coefficient between dynamic analog weights of the at least two terminal devices. Therefore, throughputs of the plurality of second terminal devices can be increased.

According to the fourth implementation of the first aspect, in a fifth implementation of the first aspect of embodiments of this application, that the network device configures a dynamic analog beam for the at least two second terminal devices based on the correlation coefficient between the dynamic analog weights of the at least two second terminal devices includes: The network device determines that second terminal devices corresponding to a correlation coefficient greater than a third preset value are third terminal devices, to obtain a set of third terminal devices; the network device obtains a volume of to-be-transmitted data of a third terminal device with a highest priority in the set of third terminal devices; and when the volume of the to-be-transmitted data is greater than or equal to a fourth preset value, the network device configures a dynamic analog beam of the third terminal device only for the third terminal device.

According to the fifth implementation of the first aspect, in a sixth implementation of the first aspect of embodiments of this application, the method further includes: When the volume of the to-be-transmitted data is less than the fourth preset value, and the set of third terminal devices include at least two third terminal devices, the network device calculates that the at least two third terminal devices in the set of third terminal devices share the dynamic analog beam.

According to a second aspect, an embodiment of this application provides a communications device, including: a communications module, configured to measure a sounding reference signal (SRS) of each first terminal device in a set of first terminal devices, to obtain information about the SRS of each first terminal device; and a processing module, configured to determine, based on the information about the SRS of each first terminal device, a set of second terminal devices from the set of first terminal devices and static analog beam information of each second terminal device in the set of second terminal devices. The network device determines beam domain channel information based on the static analog beam information. The processing module is further configured to determine dynamic analog beam information of each second terminal device based on the static analog beam information and the beam domain channel information. The processing module is further configured to configure a dynamic analog beam for the second terminal device based on the dynamic analog beam information.

It should be noted that the static analog beam information is used to indicate N static analog beams matching the second terminal device, and N is an integer greater than or equal to 1. The beam domain channel information is used to indicate channel quality of N channels between the network device and the second terminal device, and the N static analog beams are in a one-to-one correspondence with the N channels. The dynamic analog beam information is used to indicate a dynamic analog beam available to the second terminal device.

In this embodiment of this application, the network device determines, based on the static analog beam information of the second terminal device and the beam domain channel information of the second terminal device, a dynamic analog beam available to each second terminal device, and configures the dynamic analog beam for the second terminal device based on the dynamic analog beam information. The beam domain channel information of the second terminal device can reflect channel quality between the terminal device and the network device, and the static analog beam information of the second terminal device can reflect an existing static analog beam near the terminal device. Therefore, the dynamic analog beam determined based on the static analog beam information and the beam domain channel information better matches a channel of the second terminal device, thereby increasing a throughput of the second terminal device.

According to the second aspect, in a first implementation of the second aspect of embodiments of this application, the processing module is specifically configured to: determine, from the set of first terminal devices, that a first terminal device whose SINR value of the SRS is greater than a first preset value is a second terminal device, to obtain the set of second terminal devices; and determine static analog beam information of the second terminal device.

In this implementation, a manner of determining the second terminal device is specified. Because the information about the SRS includes the signal to interference plus noise ratio (SINR) value of the SRS, the network device may select, based on the SINR value of the SRS, a second terminal device that meets a condition.

According to the second aspect, in a second implementation of the second aspect of embodiments of this application, the processing module is specifically configured to: obtain a moving speed of each first terminal device in the set of first terminal devices; determine, from the set of first terminal devices, that a first terminal device whose SINR value of the SRS is greater than a first preset value and whose moving speed is less than a second preset value is a second terminal device, to obtain the set of second terminal devices; and determine, by the network device, static analog beam information of the second terminal device.

In this implementation, another manner of determining the second terminal device is provided. In addition to the SINR value of the SRS, the moving speed of the first terminal device should be considered. Therefore, this helps improve accuracy of determining the second terminal device.

According to the second aspect, the first implementation of the second aspect, and the second implementation of the second aspect, in a third implementation of the second aspect of embodiments of this application, the processing module is specifically configured to: calculate an SRS beam domain channel covariance matrix of each second terminal device based on the SRS beam domain channel matrix of each second terminal device; calculate an SRS fullband beam domain channel covariance matrix based on the SRS beam domain channel covariance matrix of the second terminal device; and calculate a dynamic analog weight based on an eigenvector of the SRS fullband beam domain channel covariance matrix, where the dynamic analog weight is used to indicate a dynamic analog beam available to the second terminal device.

In this implementation, an exemplary implementation of calculating the dynamic analog weight of the second terminal device is provided. Because the dynamic analog weight is calculated based on a "maximum SINR criterion", it can be ensured that the terminal device can obtain a highest throughput under the calculated dynamic analog weight.

According to the third implementation of the second aspect, in a fourth implementation of the second aspect of embodiments of this application, the processing module is specifically configured to: calculate a correlation coefficient between dynamic analog weights of at least two second terminal devices in the set of second terminal devices based on the dynamic analog weight of each second terminal device in the set of second terminal devices, where the correlation coefficient is used to indicate correlation between the dynamic analog weights of the at least two second terminal devices; and configure a dynamic analog beam for the at least two second terminal devices based on the correlation coefficient between the dynamic analog weights of the at least two second terminal devices.

In this implementation, the network device may allocate a dynamic analog beam to at least two terminal devices based on a correlation coefficient between dynamic analog weights of the at least two terminal devices. Therefore, throughputs of the plurality of second terminal devices can be increased.

According to the fourth implementation of the second aspect, in a fifth implementation of the second aspect of embodiments of this application, the processing module is specifically configured to: determine that second terminal devices corresponding to a correlation coefficient greater than a third preset value are third terminal devices, to obtain a set of third terminal devices; obtain a volume of to-be-transmitted data of a third terminal device with a highest priority in the set of third terminal devices; and when the volume of the to-be-transmitted data is greater than or equal to a fourth preset value, configure a dynamic analog beam of the third terminal device for the third terminal device.

According to the fifth implementation of the second aspect, in a sixth implementation of the second aspect of embodiments of this application, the processing module is further configured to: when the volume of the to-be-transmitted data is less than the fourth preset value, and the set of third terminal devices include at least two third terminal devices, calculate that the at least two third terminal devices in the set of third terminal devices share the dynamic analog beam.

According to a third aspect, an embodiment of this application provides a communications device. The communications device may be a network device, or may be a chip in a network device. The communications device may include a processing unit and a communications unit. When the communications device is a network device, the processing unit may be a processor, and the communications unit may be a transceiver. The network device may further include a storage unit, and the storage unit may be a memory. The storage unit is configured to store instructions, and the processing unit executes the instructions stored in the storage unit, so that the network device performs the method in any one of the second aspect or the implementations of the second aspect. When the communications device is a chip in a network device, the processing unit may be a processor, and the communications unit may be an input/output interface, a pin, a circuit, or the like. The processing unit executes instructions stored in a storage unit, so that the network device performs the method in any one of the second aspect or the implementations of the second aspect. The storage unit may be a storage unit (for example, a register or a cache) in the chip, or may be a storage unit (for example, a read-only memory or a random access memory) that is in the network device and that is located outside the chip.

According to a fourth aspect, an embodiment of this application provides a communications system, including a terminal device and a network device. The network device performs the method described in the first aspect and the implementations of the first aspect. The terminal device is configured to send a sounding reference signal SRS, and receive resource scheduling of the network device.

According to a fifth aspect, an embodiment of this application provides a computer-readable storage medium, including instructions. When the instructions are run on a computer, the computer is enabled to perform the method described in the first aspect and the implementations of the first aspect.

According to a sixth aspect, an embodiment of this application provides a computer program product including instructions. When the computer program product runs on a computer, the computer is enabled to perform the method described in the first aspect and the implementations of the first aspect.

According to the foregoing technical solutions, it can be learned that embodiments of this application have the following advantages.

In embodiments of this application, the network device determines, based on the static analog beam information of the second terminal device and the beam domain channel information of the second terminal device, a dynamic analog beam available to each second terminal device, and configures the dynamic analog beam for the second terminal device based on the dynamic analog beam information. The beam domain channel information of the second terminal device can reflect channel quality between the terminal device and the network device, and the static analog beam information of the second terminal device can reflect an existing static analog beam near the terminal device. Therefore, the dynamic analog beam determined based on the static analog beam information and the beam domain channel information better matches a channel of the second terminal device, thereby increasing a throughput of the second terminal device.

BRIEF DESCRIPTION OF DRAWINGS

To describe technical solutions in embodiments of this application more clearly, the following briefly describes the accompanying drawings. The accompanying drawings in the following description show merely some embodiments of this application.

DESCRIPTION OF EMBODIMENTS

The following describes technical solutions in embodiments of this application with reference to the accompanying drawings in embodiments of this application. The described embodiments are merely some but not all of embodiments of this application.

In this application, terms such as "first", "second", "third", and "fourth" (if exists) in the specification, the claims, and the accompanying drawings are intended to distinguish between similar objects but do not necessarily indicate a specific order or sequence. It should be understood that the data used in such a way are interchangeable in proper cases so that embodiments described herein can be implemented in an order except the order illustrated or described herein. In addition, terms such as "comprise", "have", and any variations thereof are intended to cover non-exclusive inclusions, for example, a process, method, system, product, or device that includes a series of steps or units is not necessarily limited to those clearly listed steps or units, but may include other steps or units that are not clearly listed or inherent to such a process, method, product, or device.

Embodiments of this application provide a resource scheduling method, to increase a throughput of data transmission between a network device and a terminal device.

For ease of understanding, the following first explains some technical terms in embodiments of this application.

Beamforming (BF), also referred to as beam forming, means that a network device performs weighted processing on transmitted data based on channel information, to form a narrow beam with energy aimed at a target terminal device, thereby increasing a received signal to interference plus noise ratio of the target terminal device.

Signal to interference plus noise ratio (SINR) is a ratio of power of a wanted signal measured by the network device at a specific point of a transmission channel under a given condition to total power of an interfering signal plus electromagnetic noise.

The foregoing describes some terms in embodiments of this application. The following describes a system architecture and an application scenario to which embodiments of this application are applicable.

Figure 1:
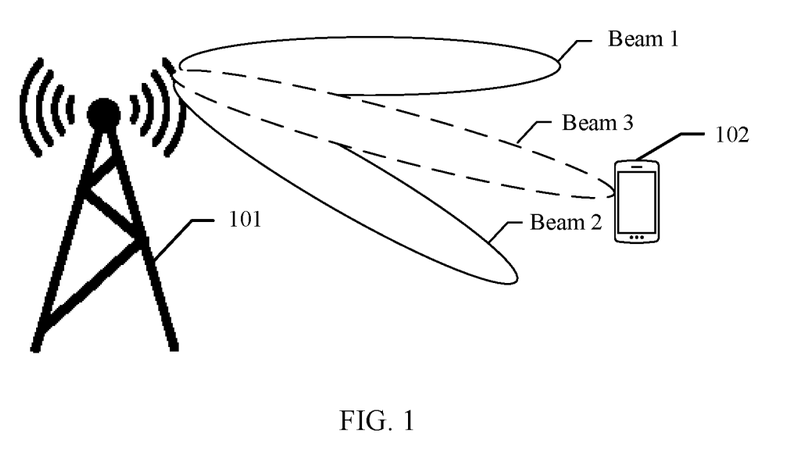
FIG. 1 is an application scenario diagram of a resource scheduling method according to an embodiment of this application.

Technical solutions in embodiments of this application may be applicable to a fifth generation (5G) mobile communications system, a subsequently evolved system, and the like. This is not specifically limited herein. In 5G, to reduce costs and ensure base station performance, a 5G millimeter-wave base station usually uses a hybrid beamforming (HBF) technology to receive and transmit signals. As shown in FIG. 1, the scenario includes a network device 101 and a terminal device 102. There are a plurality of static analog beams (for example, a beam 1 and a beam 2) between the network device 101 and the terminal device 102. When the network device 101 allocates a scheduled resource to the terminal device 102, the network device 101 may determine a dynamic analog beam (for example, a beam 3) by using the method in embodiments of this application, and use the dynamic analog beam to allocate a scheduled resource to the terminal device 102, to increase a received signal to interference plus noise ratio of the terminal device 102, thereby increasing a throughput of data transmission between the network device 101 and the terminal device 102.

It should be understood that, in embodiments of this application, the network device 101 may be a radio access network (RAN) device. Specifically, the RAN device may be a base station or an access point, or may be a device that is in an access network and that communicates with the terminal device over an air interface through one or more cells. The network device 101 may be configured to: mutually convert a received over-the-air frame and an Internet protocol (IP) packet, and serve as a router between the terminal device and a remaining part of the access network, where the remaining part of the access network may include an IP network. The network device 101 may further coordinate attribute management for the air interface. For example, the network device 101 may include a next generation NodeB (gNB) in a 5G new radio (NR) system, or may include a centralized unit (CU) and a distributed unit (DU) in a cloud radio access network (Cloud RAN) system. This is not limited in embodiments of this application.

It should be noted that the network device 101 in embodiments of this application may be any one of the foregoing devices or chips. This is not specifically limited herein. Regardless of serving as a device or a chip, the network device 101 may be manufactured, sold, or used as an independent product. In this embodiment and subsequent embodiments, only a network device is used as an example for description.

In addition, the terminal device 102 in embodiments of this application includes a device that provides voice and/or data connectivity for a user. For example, the terminal device 102 may include a handheld device having a wireless connection function, or a processing device connected to a wireless modem. The terminal device 102 may communicate with a core network through a radio access network (RAN), and exchange voice and/or data with the RAN. The terminal device may include user equipment (UE), a wireless terminal device, a mobile terminal device, a subscriber unit, a subscriber station, a mobile station, a mobile console (mobile), a remote station, an access point (AP), a remote terminal, an access terminal, a user terminal, a user agent, a user device, or the like. For example, the terminal device 102 may include a mobile phone, a computer with a mobile terminal device, a portable, pocket-sized, or handheld mobile apparatus, a mobile apparatus built in a computer, a vehicle-mounted mobile apparatus, an intelligent wearable device, or the like. For example, the terminal device 102 may be a device such as a personal communications service (PCS) phone, a cordless telephone set, a session initiation protocol (SIP) phone, a wireless local loop (WLL) station, or a personal digital assistant (PDA). The terminal device 102 alternatively includes a limited device, for example, a device with low power consumption, a device with a limited storage capability, or a device with a limited computing capability. For example, the terminal device 102 includes information sensing devices such as a barcode, radio frequency identification (RFID), a sensor, a global positioning system (GPS), and a laser scanner.

The terminal device 102 in embodiments of this application may be any one of the foregoing devices or chips. This is not specifically limited herein. Regardless of serving as a device or a chip, the terminal device 102 may be manufactured, sold, or used as an independent product. In this embodiment and subsequent embodiments, only a terminal device is used as an example for description.

Figure 2:
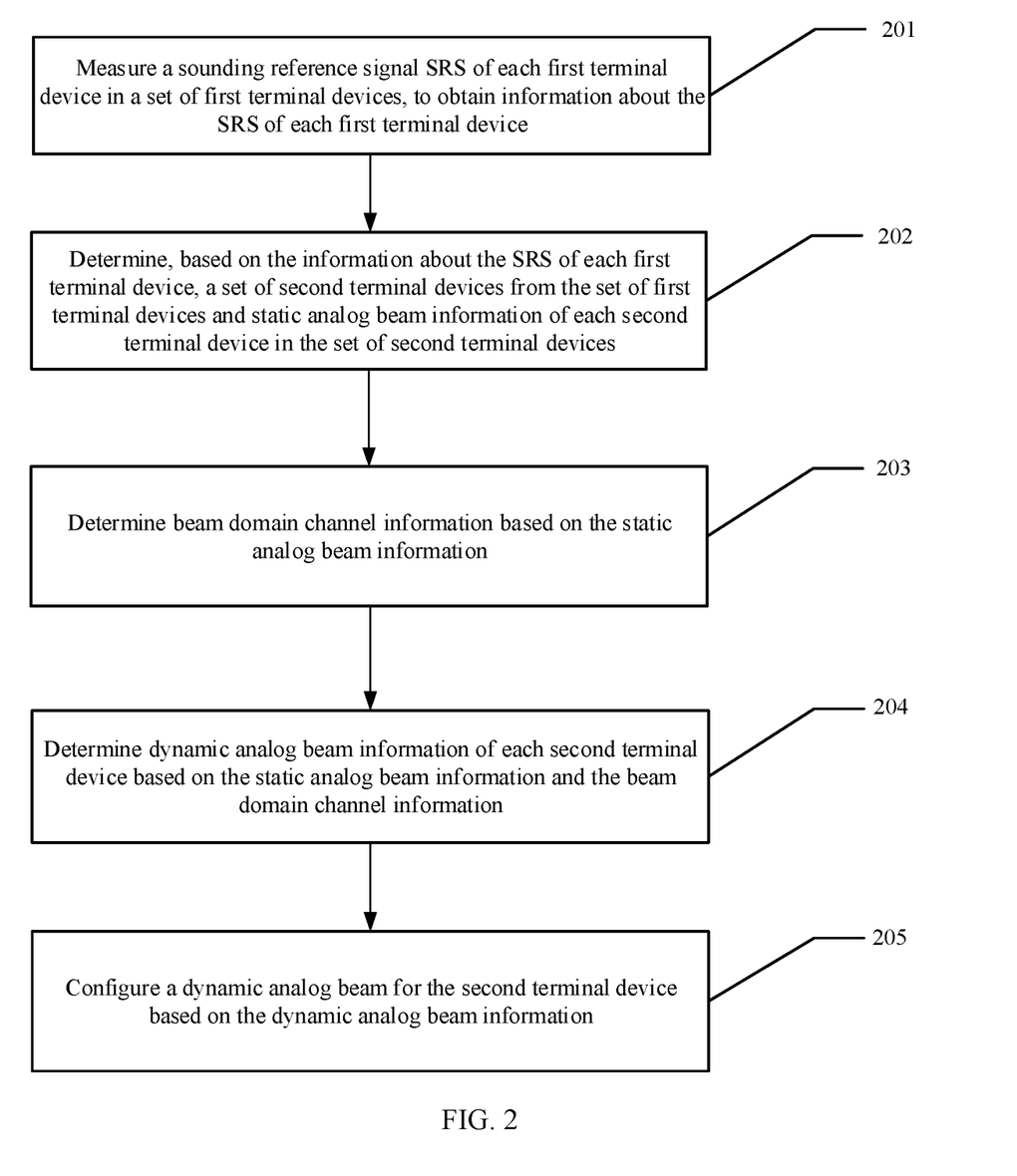
FIG. 2 is a flowchart of a resource scheduling method according to an embodiment of this application.

To better understand solutions in embodiments of this application, the following describes an exemplary procedure of the resource scheduling method in embodiments. As shown in FIG. 2, steps performed by a terminal device and a network device in the resource scheduling method include:

201. The network device measures a sounding reference signal (SRS) of each first terminal device in a set of first terminal devices, to obtain information about the SRS of each first terminal device.

In this embodiment, to more properly perform resource scheduling and allocation for the terminal device, the network device needs to know quality information of a channel between the terminal device and the network device. Specifically, the network device may measure the sounding reference signal SRS of each first terminal device in the set of first terminal devices. The first terminal device is a terminal device near the network device, and the network device may measure a reference signal of the first terminal device. The set of first terminal devices include one first terminal device or a plurality of first terminal devices. This is not specifically limited herein. Because the network device measures the SRS of each first terminal device in the set of first terminal devices, the network device may obtain the information about the SRS of each first terminal device in the set of first terminal devices.

Optionally, the information about the SRS may be a signal to interference plus noise ratio (SINR) value of the SRS, and the SINR value may reflect a ratio of power of a wanted signal on a transmission channel between the first terminal device and the network device to total power of an interfering signal plus electromagnetic noise. Therefore, the SINR value can reflect channel quality between the first terminal device and the network device.

202. The network device determines, based on the information about the SRS of each first terminal device, a set of second terminal devices from the set of first terminal devices and static analog beam information of each second terminal device in the set of second terminal devices.

The second terminal device is a terminal device selected by the network device from the set of first terminal devices, and a quantity of terminal devices in the set of second terminal devices is less than or equal to a quantity of terminal devices in the set of first terminal devices.

Specifically, the network device may select the set of second terminal devices from the set of first terminal devices in a plurality of manners.

In an optional manner, the network device may directly determine the set of second terminal devices based on the SINR value of the SRS. Specifically, the network device compares the SINR value of the SRS with a first preset value, and determines that a first terminal device whose SINR value of the SRS is greater than the first preset value is a second terminal device. Therefore, the network device may obtain the set of second terminal devices.

It should be understood that the first preset value may vary with an application scenario. This is not specifically limited herein.

In another optional manner, when determining the second terminal device, the network device not only refers to the information about the SRS of the first terminal device, but also refers to a moving speed of the first terminal device. Specifically, the network device may obtain a moving speed of each first terminal device in the set of first terminal devices, and then determine, from the set of first terminal devices, that a first terminal device whose SINR value of the SRS is greater than a first preset value and whose moving speed is less than a second preset value is a second terminal device, to obtain the set of second terminal devices.

In addition, after the network device determines the set of second terminal devices, the network device may further determine static analog beam information of the second terminal device. The static analog beam information is used to indicate N static analog beams matching the second terminal device, and N is an integer greater than or equal to 1.

203. The network device determines beam domain channel information based on the static analog beam information.

In this embodiment, after the network device determines the static analog beam information of the second terminal device, the network device may determine the beam domain channel information based on the static analog beam information. The beam domain channel information is used to indicate channel quality of N channels between the network device and the second terminal device. Because directions in which the static analog beams matching the second terminal device point to the second terminal device are different, each static analog beam of the second terminal device corresponds to one channel, that is, the N static analog beams are in a one-to-one correspondence with the N channels.

Specifically, the beam domain channel information includes an SRS beam domain channel matrix. Specifically, when determining the beam domain channel information, the network device may poll each static analog beam of the second terminal device to measure an SRS beam domain channel corresponding to each static analog beam, to obtain the SRS beam domain channel matrix.

204. The network device determines dynamic analog beam information of each second terminal device based on the static analog beam information and the beam domain channel information.

In this embodiment, after the network device determines the static analog beam information and the beam domain channel information, the network device determines the dynamic analog beam information of each second terminal device based on the static analog beam information and the beam domain channel information. The dynamic analog beam information is used to indicate a dynamic analog beam available to the second terminal device, and the dynamic analog beam better matches the second terminal device. In addition, the static analog beam information includes N static analog beam weights, and the N static analog beam weights are in a one-to-one correspondence with the N static analog beams. The beam domain channel information includes an SRS beam domain channel matrix.

Specifically, that the network device determines the dynamic analog beam information of each second terminal device may be divided into the following steps:

S1. The network device calculates an SRS beam domain channel covariance matrix of each second terminal device based on the SRS beam domain channel matrix of each second terminal device.

Specifically, the network device may determine the SRS beam domain channel covariance matrix according to the following formula:

DLPartSrsBeamCovAvg($CC_n$)=DLPartSrsBeamChan($CC_n$)[DLPartSrsBeamChan($CC_n$)]$^H$ DLPartSrsBeamChan($CC_n$) is the SRS beam domain channel matrix of the second terminal device, that is, a matrix including N static analog beam weights of the second terminal device on a component carrier (CC). In other words, the N static analog beam weights form a column vector with N rows and one column, and each element in the column vector is one static analog beam weight. In addition, [DLPartSrsBeamChan($CC_n$)]$^H$ is conjugate transpose of DLPartSrsBeamChan($CC_n$).

In addition, DLPartSrsBeamCovAvg($CC_n$) is the SRS beam domain channel covariance matrix of the second terminal device.

S2. The network device calculates an SRS fullband beam domain channel covariance matrix based on the SRS beam domain channel covariance matrix of the second terminal device.

Specifically, the network device may perform inter-component carrier smoothing processing on the N SRS beam domain channel covariance matrices, to obtain the SRS fullband beam domain channel covariance matrix. A specific formula is as follows:

$$DLPartSrsBeamCovAvg(TRX_i) = \frac{1}{K}\sum_{n=1}^{K} DLPartSrsBeamCovAvg(CC_n)$$

DLPartSrsBeamCovAvg($CC_n$) is the SRS beam domain channel covariance matrix of the second terminal device. DLPartSrsBeamCovAvg($TRX_i$) is an SRS fullband beam domain channel covariance matrix of a single dipole. K is a quantity of component carriers in a cell in which the second terminal device is located.

It should be understood that the network device includes a plurality of dipoles, and separately calculates, for each of the plurality of dipoles, an SRS fullband beam domain channel covariance matrix by using the foregoing formula, to separately further calculate a dynamic analog weight.

S3. The network device calculates a dynamic analog weight based on an eigenvector of the SRS fullband beam domain channel covariance matrix.

The dynamic analog weight is used to indicate a dynamic analog beam available to the second terminal device.

Specifically, in an optional implementation, when the network device does not support amplitude modulation, the network device may perform eigendecomposition on the SRS fullband beam domain channel covariance matrix, and use an eigenvector corresponding to a maximum eigenvalue of the SRS fullband beam domain channel covariance matrix as a combination coefficient vector. Then, the network device performs linear combination on beam weights of the N static analog beams by using the combination coefficient vector. Finally, the network device uses a phase of a combination vector of the beam weights of the N static analog beams as the dynamic analog weight of the second terminal device. A specific formula is as follows:

$w = \text{angle}(W_{SRS}\varepsilon)$

In the foregoing formula, $W_{SRS}$ is a matrix including the beam weights of the N static analog beams, $\varepsilon$ is an eigenvector corresponding to a maximum eigenvalue of DLPartSrsBeamCovAvg($TRX_i$), and angle(g) is an operator for obtaining a complex phase.

In another optional implementation, when the network device supports amplitude modulation, the network device may perform eigendecomposition on the SRS fullband beam domain channel covariance matrix, and use an eigenvector corresponding to a maximum eigenvalue of the SRS fullband beam domain channel covariance matrix as a combination coefficient vector. Then, the network device performs linear combination on beam weights of the N static analog beams by using the combination coefficient vector, to obtain the dynamic analog weight. A specific formula is as follows:

$w = W_{SRS}\varepsilon$ $W_{SRS}$ is a matrix including a beam weight of an SRS beam set, and $\varepsilon$ is an eigenvector corresponding to a maximum eigenvalue of DLPartSrsBeamCovAvg($TRX_i$).

It should be understood that, in actual application, the network device may determine the dynamic analog weight by using any one of the foregoing implementations. Specifically, this varies with a capability of the network device to support amplitude modulation or phase modulation, and is not specifically limited herein.

205. The network device configures a dynamic analog beam for the second terminal device based on the dynamic analog beam information.

In this embodiment, the network device calculates a correlation coefficient between at least two second terminal devices in the set of second terminal devices based on the dynamic analog weight of each second terminal device in the set of second terminal devices, and then configures a dynamic analog beam for the at least two second terminal devices based on the correlation coefficient between the at least two second terminal devices.

The correlation coefficient is used to indicate correlation between locations of the at least two second terminal devices. It should be understood that a larger correlation coefficient between the two or more second terminal devices indicates stronger location correlation between the two or more second terminal devices, that is, geographical locations of the two or more second terminal devices are closer.

Specifically, the network device may configure the dynamic analog beam for the at least two second terminal devices in the following manner:

First, the network device calculates a correlation coefficient between at least two second terminal devices in the set of second terminal devices, and determines that second terminal devices corresponding to a correlation coefficient greater than a third preset value are third terminal devices, to obtain a set of third terminal devices. For ease of understanding, an example in which the set of second terminal devices include four second terminal devices is used for description, and is specifically shown in Table 1.

TABLE 1

| Correlation coefficient | Second terminal device 1 | Second terminal device 2 | Second terminal device 3 | Second terminal device 4 |
| --- | --- | --- | --- | --- |
| Second terminal device 1 | — | 0.89 | 0.85 | 0.83 |
| Second terminal device 2 | 0.89 | — | 0.84 | 0.88 |
| Second terminal device 3 | 0.85 | 0.84 | — | 0.82 |
| Second terminal device 4 | 0.83 | 0.88 | 0.82 | — |

Table 1 shows correlation coefficients between each of the four different second terminal devices and the other second terminal devices in the four different second terminal devices. For example, a correlation coefficient between dynamic analog weights of the second terminal device 1 and the second terminal device 2 is 0.89, a correlation coefficient between dynamic analog weights of the second terminal device 1 and the second terminal device 3 is 0.85, and a correlation coefficient between dynamic analog weights of the second terminal device 1 and the second terminal device 4 is 0.83. If the third preset value is 0.86, the correlation coefficient between the dynamic analog weights of the second terminal device 1 and the second terminal device 2 is 0.89, where 0.89>0.86, and a correlation coefficient between dynamic analog weights of the second terminal device 2 and the second terminal device 4 is 0.88, where 0.88>0.86. Therefore, the network device may determine that the second terminal device 1 is a third terminal device, the second terminal device 2 is a third terminal device, and the second terminal device 4 is a third terminal device. Therefore, the set of third terminal devices obtained by the network device includes the second terminal device 1, the second terminal device 2, and the second terminal device 4. It should be understood that the third preset value may vary with an application scenario. This is not specifically limited herein. In addition, Table 1 is merely used as an example, and a specific value of the correlation coefficient is not limited.

It should be understood that, because the correlation coefficients between the third terminal devices are greater than the third preset value, the three third terminal devices may share one dynamic analog beam. That is, the network device may allocate a dynamic analog beam of a third terminal device in the three third terminal devices to the three third terminal devices.

In an optional implementation, the network device may perform allocation based on a priority. Specifically, the network device obtains a priority of each third terminal device in the set of third terminal devices, and determines a dynamic analog beam of a third terminal device with a highest priority in the set of third terminal devices as a shared dynamic analog beam. With reference to the foregoing example, in this case, among the second terminal device 1, the second terminal device 2, and the second terminal device 4 in the set of third terminal devices, if the second terminal device 1 has a highest priority, the network device determines that a dynamic analog beam of the second terminal device 1 is a common dynamic analog beam, that is, configures the dynamic analog beam of the second terminal device 1 for the second terminal device 1, the second terminal device 2, and the second terminal device 4.

It should be understood that the foregoing implementation is applicable to a case in which a volume of data transmitted by each third terminal device in the set of third terminal devices is relatively small, that is, a case in which each third terminal device in the set of third terminal devices needs a relatively small quantity of transmission resources.

In another optional implementation, the network device not only obtains a priority of each third terminal device in the set of third terminal devices, but also obtains a volume of to-be-transmitted data of a third terminal device with a highest priority in the set of third terminal devices. When the volume of the to-be-transmitted data is greater than or equal to a fourth preset value, the foregoing one dynamic analog beam may be sufficient for use by only the foregoing one third terminal device. In this case, the network device configures the dynamic analog beam of the third terminal device only for the third terminal device. In addition, when the volume of the to-be-transmitted data is less than the fourth preset value, and the set of third terminal devices include at least two third terminal devices, the network device calculates that the at least two third terminal devices in the set of third terminal devices share the dynamic analog beam.

In addition to the foregoing implementation, the network device may configure the dynamic analog beam for the at least two second terminal devices in the following another manner:

First, the network device obtains a priority of each second terminal device in the set of second terminal devices, and determines a second terminal device with a highest priority in the set of second terminal devices; then, calculates a correlation coefficient between a dynamic analog weight of the second terminal device with the highest priority and a dynamic analog weight of another terminal device in the set of second terminal devices; and then, determines that a second terminal device whose correlation coefficient is greater than a third preset value and the second terminal device with the highest priority share one dynamic analog beam.

For ease of understanding, an example in which the set of second terminal devices include four second terminal devices, and a second terminal device 1 in the four second terminal devices is a second terminal device with a highest priority is used for description, and is specifically shown in Table 2.

TABLE 2

| Correlation coefficient | Second terminal device 1 | Second terminal device 2 | Second terminal device 3 | Second terminal device 4 |
| --- | --- | --- | --- | --- |
| Second terminal device 1 | — | 0.89 | 0.85 | 0.83 |

Table 2 shows correlation coefficients between dynamic analog weights of each of the four different second terminal devices and the second terminal device 1. For example, a correlation coefficient between dynamic analog weights of the second terminal device 1 and the second terminal device 2 is 0.89, a correlation coefficient between dynamic analog weights of the second terminal device 1 and the second terminal device 3 is 0.85, and a correlation coefficient between dynamic analog weights of the second terminal device 1 and the second terminal device 4 is 0.83. If the third preset value is 0.86, it may be determined that the correlation coefficient between the dynamic analog weights of the second terminal device 1 and the second terminal device 2 is greater than the third preset value. Therefore, the network device may determine that the second terminal device 1 and the second terminal device 2 share the dynamic analog beam.

In this embodiment, the network device determines, based on the static analog beam information of the second terminal device and the beam domain channel information of the second terminal device, a dynamic analog beam available to each second terminal device, and configures the dynamic analog beam for the second terminal device based on the dynamic analog beam information. The beam domain channel information of the second terminal device can reflect channel quality between the terminal device and the network device, and the static analog beam information of the second terminal device can reflect an existing static analog beam near the terminal device. Therefore, the dynamic analog beam determined based on the static analog beam information and the beam domain channel information better matches a channel of the second terminal device, thereby increasing a throughput of the second terminal device.

Figure 3:
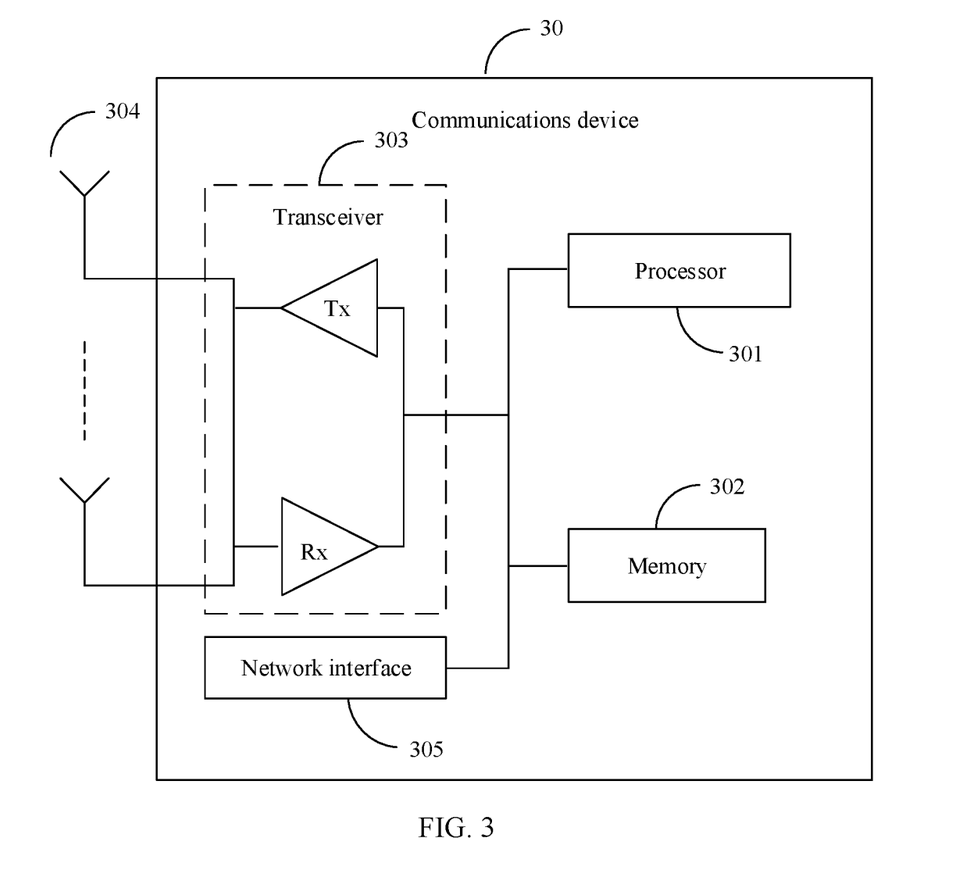
FIG. 3 is a schematic diagram of an embodiment of a network device according to an embodiment of this application.

As shown in FIG. 3, an embodiment provides a schematic diagram of a structure of another communications device 30. The network device in the method embodiment corresponding to FIG. 2 may be based on the structure of the communications device 30 shown in FIG. 3 in this embodiment.

The communications device 30 includes at least one processor 301, at least one memory 302, at least one transceiver 303, at least one network interface 305, and one or more antennas 304. The processor 301, the memory 302, the transceiver 303, and the network interface 305 are connected by using a connection apparatus, and the antenna 304 is connected to the transceiver 303. The connection apparatus may include various types of interfaces, transmission cables, buses, or the like. This is not limited in this embodiment.

The processor 301 is mainly configured to process a communications protocol and communications data, control the entire network device, execute a software program, and process data of the software program, for example, to support the communications device 30 in performing an action described in the foregoing embodiment. The communications device 30 may include a baseband processor and a central processing unit. The baseband processor is mainly configured to process a communications protocol and communications data, and the central processing unit is mainly configured to control the entire communications device 30, execute a software program, and process data of the software program. The processor 301 in FIG. 3 may integrate functions of the baseband processor and the central processing unit. A person skilled in the art may understand that the baseband processor and the central processing unit may alternatively be independent processors, and are interconnected by using a technology such as a bus. A person skilled in the art may understand that the communications device 30 may include a plurality of baseband processors to adapt to different network standards, and the communications device 30 may include a plurality of central processing units to enhance a processing capability of the communications device 30. Various components of the communications device 30 may be connected through various buses. The baseband processor may alternatively be expressed as a baseband processing circuit or a baseband processing chip. The central processing unit may alternatively be expressed as a central processing circuit or a central processing chip. A function of processing the communications protocol and the communications data may be built in the processor, or may be stored in the memory in a form of a software program. The processor executes the software program to implement a baseband processing function.

In this embodiment, the memory 302 is mainly configured to store the software program and the data. The memory 302 may exist independently, and is connected to the processor 301. Optionally, the memory 302 may be integrated with the processor 301, for example, integrated into one or more chips. The memory 302 can store program code for executing technical solutions in embodiments of this application, and the processor 301 controls the execution. Various types of executed computer program code may also be considered as drivers of the processor 301. It should be understood that FIG. 3 in this embodiment shows only one memory and one processor. However, in actual application, the communications device 30 may have a plurality of processors or a plurality of memories. This is not specifically limited herein. In addition, the memory 302 may alternatively be referred to as a storage medium, a storage device, or the like. The memory 302 may be a storage element located on a same chip as the processor, namely, an on-chip storage element, or an independent storage element. This is not limited in embodiments of this application.

In this embodiment, the transceiver 303 may be configured to support receiving or sending of a radio frequency signal between the communications device 30 and a network device, and the transceiver 303 may be connected to the antenna 304. The transceiver 303 includes a transmitter Tx and a receiver Rx. Specifically, the one or more antennas 304 may receive a radio frequency signal. The receiver Rx of the transceiver 303 is configured to: receive the radio frequency signal from the antenna 304, convert the radio frequency signal into a digital baseband signal or a digital intermediate frequency signal, and provide the digital baseband signal or the digital intermediate frequency signal for the processor 301, so that the processor 301 further processes (for example, demodulates or decodes) the digital baseband signal or the digital intermediate frequency signal. In addition, the transmitter Tx in the transceiver 303 is further configured to receive a modulated digital baseband signal or digital intermediate frequency signal from the processor 301, convert the modulated digital baseband signal or digital intermediate frequency signal into a radio frequency signal, and send the radio frequency signal through the one or more antennas 304. Specifically, the receiver Rx may selectively perform one-level or multi-level down frequency mixing processing and analog-to-digital conversion processing on the radio frequency signal to obtain a digital baseband signal or a digital intermediate frequency signal, and a sequence of the down frequency mixing and the analog-to-digital conversion processing is adjustable. The transmitter Tx may selectively perform one or more levels of up-mixing processing and digital-to-analog conversion processing on the modulated digital baseband signal or the digital intermediate frequency signal to obtain a radio frequency signal, and a sequence of the up-mixing processing and the digital-to-analog conversion processing is adjustable. The digital baseband signal and the digital intermediate frequency signal may be collectively referred to as a digital signal.

It should be understood that the transceiver 303 may alternatively be referred to as a transceiver unit, a transceiver, a transceiver apparatus, or the like. Optionally, a component in the transceiver unit for implementing a receiving function may be considered as a receiving unit. A component in the transceiver unit for implementing a sending function may be considered as a sending unit. That is, the transceiver unit includes the receiving unit and the sending unit. The receiving unit may alternatively be referred to as a receiver, an input port, a receiving circuit, or the like. The sending unit may be referred to as a transmitter, a transmitting machine, a transmitting circuit, or the like.

In addition, the network interface 305 is configured to connect the communications device 30 to another communications device through a communications link. Specifically, the network interface 305 may include a network interface such as an S1 interface between the communications device 30 and a core network element. The network interface 305 may also include a network interface such as an X2 or Xn interface between the communications device 30 and another network device (for example, another access network device or another core network element).

Figure 4:
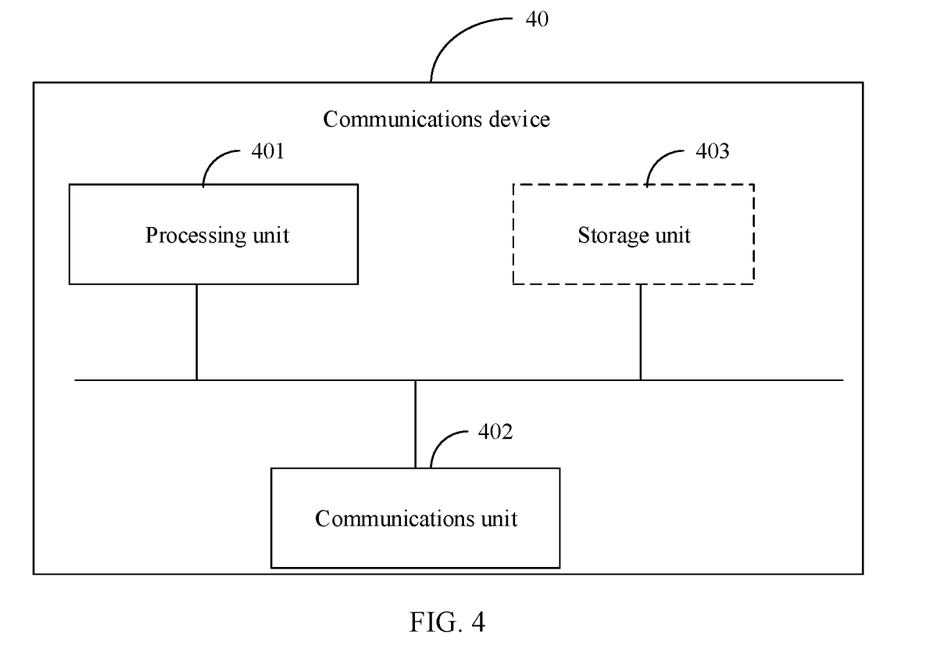
FIG. 4 is a schematic diagram of another embodiment of a network device according to an embodiment of this application.

As shown in FIG. 4, an embodiment provides another communications device 40. The communications device 40 may be a network device or a chip in a network device.

When the communications device 40 is a network device, for an exemplary schematic diagram of a structure of the communications device 40, refer to the structure of the communications device 30 shown in FIG. 3. Optionally, a communications unit 402 of the communications device 40 may include the antenna and the transceiver of the communications device 30, for example, the antenna 304 and the transceiver 303 in FIG. 3. Optionally, the communications unit 402 may further include a network interface, for example, the network interface 305 in FIG. 3.

When the communications device 40 is a chip in the network device in this embodiment of this application, the communications unit 402 may be an input/output interface, a pin, a circuit, or the like. The storage unit 403 may be a register, a cache, a RAM, or the like. The storage unit 403 may be integrated with the processing unit 401. The storage unit 403 may be a ROM or another type of static storage device capable of storing static information and instructions. The storage unit 403 may be independent of the processing unit 401. When the communications device 40 is a network device or a chip in a network device, the processing unit 401 can implement the method performed by the network device in the foregoing embodiment.

In a possible design, the processing unit 401 may include instructions, and the instructions may be run on a processor, so that the communications device 40 performs the method performed by the network device in the foregoing embodiment.

In another possible design, the storage unit 403 stores instructions, and the instructions may be run on the processing unit 401, so that the communications device 40 performs the method performed by the network device in the foregoing embodiment. Optionally, the storage unit 403 may further store data. Optionally, the processing unit 401 may also store instructions and/or data.

Specifically, the processing unit 401 is configured to measure a sounding reference signal SRS of each first terminal device in a set of first terminal devices, to obtain information about the SRS of each first terminal device.

The processing unit 401 is further configured to determine, based on the information about the SRS of each first terminal device, a set of second terminal devices from the set of first terminal devices and static analog beam information of each second terminal device in the set of second terminal devices.

The processing unit 401 is further configured to determine beam domain channel information based on the static analog beam information.

The processing unit 401 is further configured to determine dynamic analog beam information of each second terminal device based on the static analog beam information and the beam domain channel information.

The processing unit 401 is further configured to configure a dynamic analog beam for the second terminal device based on the dynamic analog beam information.

For the rest, refer to steps performed by the network device in the foregoing embodiment. Details are not described herein.

It should be understood that the terminal device may include a functional unit (means) corresponding to a step of the method or procedure of the terminal device, and the network device may include a functional unit corresponding to a step of the method or procedure of the network device. One or more of the foregoing modules or units may be implemented by using software, hardware, or a combination thereof. When any one of the foregoing modules or units is implemented by using software, the software exists in a form of computer program instructions, and is stored in a memory. A processor may be configured to execute the program instructions to implement the foregoing method procedure.

The processor in this application may include but is not limited to at least one of the following: various computing devices that run software, for example, a central processing unit CPU, a microprocessor, a digital signal processor (DSP), a microcontroller unit (MCU), or an artificial intelligence processor. Each computing device may include one or more cores for executing software instructions to perform calculation or processing. The processor may be a separate semiconductor chip; or may be integrated with another circuit into a semiconductor chip, for example, may form a system-on-a-chip (SoC) with another circuit (for example, a codec circuit, a hardware acceleration circuit, or various bus and interface circuits); or may be integrated into an application-specific integrated circuit (ASIC) as a built-in processor of the ASIC. The ASIC integrated with the processor may be packaged separately or may be packaged together with another circuit. The processor includes a core for executing software instructions for calculation or processing, and may further include a necessary hardware accelerator, for example, a field programmable gate array (FPGA), a programmable logic device (PLD), or a logic circuit that implements a special-purpose logic operation.

The memory in embodiments of this application may include at least one of the following types: a read-only memory (ROM) or another type of static storage device that can store static information and instructions, or a random access memory (RAM) or another type of dynamic storage device that can store information and instructions, or may be an electrically erasable programmable read-only memory (EEPROM). In some scenarios, the memory may alternatively be a compact disc read-only memory (CD-ROM) or another compact disc storage medium, an optical disc storage medium (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer. However, the memory is not limited thereto.

The bus may further include a power bus, a control bus, a status signal bus, and the like, in addition to a data bus. However, for clear description, various types of buses in the figures are marked as the bus.

In an implementation process, steps in the foregoing methods can be implemented by using a hardware integrated logical circuit in the processor, or by using instructions in a form of software. The steps of the methods disclosed with reference to embodiments of this application may be directly performed and completed by a hardware processor, or may be performed and completed by using a combination of hardware and software modules in the processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

According to a method provided in embodiments of this application, an embodiment of this application further provides a communications system, including the foregoing one or more network devices and one or more terminal devices.

It should be further understood that, "first", "second", "third", "fourth", and various numbers in this specification are merely used for differentiation for ease of description, and are not intended to limit the scope of embodiments of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in embodiments of this application. The execution sequences of the processes should be determined based on functions and internal logic of the processes, and should not be construed as any limitation on implementation processes of embodiments of this application.

A person of ordinary skill in the art may be aware that, in combination with illustrative logical blocks (illustrative logical block) described in embodiments disclosed in this specification and steps (step) may be implemented by electronic hardware or a combination of computer software and electronic hardware. Whether the functions are performed by the hardware or the software depends on particular applications and design constraints of technical solutions. A person skilled in the art may use different methods to implement the described functions for each particular application, but it should not be considered that the implementation goes beyond the scope of this application.

In embodiments provided in this application, it should be understood that a disclosed system, apparatus, or method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

All or some of the foregoing embodiments may be implemented by using software, hardware, firmware, or any combination thereof. When software is used for implementation, all or some of embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, wireless, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

It may be clearly understood by persons skilled in the art that, for purpose of convenient and brief description, for a detailed working process of the foregoing system, apparatus, and unit, refer to a corresponding process in the foregoing method embodiments, and details are not described herein again.

The foregoing embodiments are merely intended to describe technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of technical solutions of embodiments of this application.

What is claimed is:

1. A resource scheduling method, comprising:
measuring, by a network device, a sounding reference signal (SRS) of each first terminal device in a set of first terminal devices, to obtain information about the SRS of each first terminal device;
determining, by the network device based on the information about the SRS of each first terminal device, a set of second terminal devices from the set of first terminal devices and static analog beam information of each second terminal device in the set of second terminal devices, wherein the static analog beam information of a respective second terminal device indicates N static analog beams matching the respective second terminal device, and N is an integer greater than or equal to 1;
determining, by the network device, beam domain channel information based on the static analog beam information of the respective second terminal device, wherein the beam domain channel information indicates channel quality of N channels between the network device and the respective second terminal device, and the N static analog beams are in a one-to-one correspondence with the N channels;
determining, by the network device, dynamic analog beam information of the respective second terminal device based on the static analog beam information of the respective second terminal device and the beam domain channel information, wherein the dynamic analog beam information of the respective second terminal device indicates a dynamic analog beam available to the respective second terminal device; and configuring, by the network device, a dynamic analog beam for the respective second terminal device based on the dynamic analog beam information.

2. The method according to claim 1, wherein the information about the SRS of a respective first terminal device comprises a signal to interference plus noise ratio (SINR) value of the SRS of the respective first terminal device; and
wherein determining the set of second terminal devices from the set of first terminal devices comprises: determining, by the network device from the set of first terminal devices, that a first terminal device whose SINR value of the SRS is greater than a first preset value is a second terminal device, to obtain the set of second terminal devices.

3. The method according to claim 1, wherein the information about the SRS of a respective first terminal device comprises a signal to interference plus noise ratio (SINR) value of the SRS of the respective first terminal device;
wherein the method further comprises: obtaining, by the network device, a moving speed of each first terminal device in the set of first terminal devices; and
wherein determining the set of second terminal devices from the set of first terminal devices comprises: determining, by the network device from the set of first terminal devices, that a first terminal device whose SINR value of the SRS is greater than a first preset value and whose moving speed is less than a second preset value is a second terminal device, to obtain the set of second terminal devices.

4. The method according to claim 1, wherein the static analog beam information comprises N static analog beam weights, and the N static analog beam weights are in a one-to-one correspondence with the N static analog beams;
wherein the beam domain channel information comprises an SRS beam domain channel matrix; and
wherein determining the dynamic analog beam information of each second terminal device comprises:
calculating, by the network device, an SRS beam domain channel covariance matrix of each second terminal device based on the SRS beam domain channel matrix of each second terminal device, wherein the SRS beam domain channel matrix of the respective second terminal device carries the N static analog beam weights of the respective second terminal device;
calculating, by the network device, an SRS fullband beam domain channel covariance matrix based on the SRS beam domain channel covariance matrix of the respective second terminal device; and
calculating, by the network device, a dynamic analog weight based on an eigenvector of the SRS fullband beam domain channel covariance matrix, wherein the dynamic analog weight indicates a dynamic analog beam available to the respective second terminal device.

5. The method according to claim 4, wherein configuring the dynamic analog beam for the respective second terminal device comprises:
calculating, by the network device, a correlation coefficient between dynamic analog weights of at least two second terminal devices in the set of second terminal devices based on the dynamic analog weight of each second terminal device of the at least two second terminal devices, wherein the correlation coefficient indicates a correlation between the dynamic analog weights of the at least two second terminal devices; and
configuring, by the network device, a dynamic analog beam for the at least two second terminal devices based on the correlation coefficient between the dynamic analog weights of the at least two second terminal devices.

6. The method according to claim 5, wherein configuring the dynamic analog beam for the at least two second terminal devices comprises:
determining, by the network device, that second terminal devices corresponding to a correlation coefficient greater than a third preset value are third terminal devices, to obtain a set of third terminal devices;
obtaining, by the network device, a volume of to-be-transmitted data of a third terminal device with a highest priority in the set of third terminal devices; and
based on the volume of the to-be-transmitted data being greater than or equal to a fourth preset value, configuring, by the network device, a dynamic analog beam of the third terminal device only for the third terminal device.

7. The method according to claim 5, wherein the method further comprises:
determining, by the network device, that second terminal devices corresponding to a correlation coefficient greater than a third preset value are third terminal devices, to obtain a set of third terminal devices;
obtaining, by the network device, a volume of to-be-transmitted data of a third terminal device with a highest priority in the set of third terminal devices; and
based on the volume of the to-be-transmitted data being less than a fourth preset value and the set of third terminal devices comprising at least two third terminal devices, determining, by the network device, that the at least two third terminal devices share the dynamic analog beam of the third terminal device with the highest priority.

8. The method according to claim 1, wherein the method further comprises:
sending, by a respective first terminal device, a respective SRS; and
performing, by the respective second terminal device, data transmission using the dynamic analog beam configured by the network device.

9. A communications device, comprising:
a processor;
a memory; and
a bus;
wherein the processor and the memory are connected through the bus;
wherein the memory is configured to store a program; and
wherein the processor is configured to execute the program to facilitate the following being performed by the communications device:
measuring a sounding reference signal (SRS) of each first terminal device in a set of first terminal devices, to obtain information about the SRS of each first terminal device;
determining, based on the information about the SRS of each first terminal device, a set of second terminal devices from the set of first terminal devices and static analog beam information of each second terminal device in the set of second terminal devices, wherein the static analog beam information of a respective second terminal device indicates N static analog beams matching the respective second terminal device, and N is an integer greater than or equal to 1;

determining beam domain channel information based on the static analog beam information of the respective second terminal device, wherein the beam domain channel information indicates channel quality of N channels between the network device and the respective second terminal device, and the N static analog beams are in a one-to-one correspondence with the N channels;

determining dynamic analog beam information of the respective second terminal device based on the static analog beam information of the respective second terminal device and the beam domain channel information, wherein the dynamic analog beam information of the respective second terminal device indicates a dynamic analog beam available to the respective second terminal device; and configuring a dynamic analog beam for the respective second terminal device based on the dynamic analog beam information.

10. The communications device according to claim 9, wherein the processor is further configured to execute the program to facilitate the following being performed by the communications device:

determining, from the set of first terminal devices, that a first terminal device whose signal to interference plus noise ratio (SINR) value of the SRS is greater than a first preset value is a second terminal device, to obtain the set of second terminal device.

11. The communications device according to claim 9, wherein the processor is further configured to execute the program to facilitate the following being performed by the communications device:

obtaining a moving speed of each first terminal device in the set of first terminal devices; and determining, from the set of first terminal devices, that a first terminal device whose signal to interference plus noise ratio (SINR) value of the SRS is greater than a first preset value and whose moving speed is less than a second preset value is a second terminal device, to obtain the set of second terminal devices.

12. The communications device according to claim 9, wherein the processor is further configured to execute the program to facilitate the following being performed by the communications device:

calculating an SRS beam domain channel covariance matrix of each second terminal device based on the SRS beam domain channel matrix of each second terminal device, wherein the SRS beam domain channel matrix of the respective second terminal device carries the N static analog beam weights of the respective second terminal device;

calculating an SRS fullband beam domain channel covariance matrix based on the SRS beam domain channel covariance matrix of the respective second terminal device; and calculating a dynamic analog weight based on an eigenvector of the SRS fullband beam domain channel covariance matrix, wherein the dynamic analog weight indicates a dynamic analog beam available to the respective second terminal device.

13. The communications device according to claim 12, wherein the processor is further configured to execute the program to facilitate the following being performed by the communications device:

calculating a correlation coefficient between dynamic analog weights of at least two second terminal devices in the set of second terminal devices based on the dynamic analog weight of each second terminal device of the at least two second terminal devices, wherein the correlation coefficient indicates correlation between the dynamic analog weights of the at least two second terminal devices; and configuring a dynamic analog beam for the at least two second terminal devices based on the correlation coefficient between the dynamic analog weights of the at least two second terminal devices.

14. The communications device according to claim 13, wherein the processor is further configured to execute the program to facilitate the following being performed by the communications device:

determining that second terminal devices corresponding to a correlation coefficient greater than a third preset value are third terminal devices, to obtain a set of third terminal devices;

obtaining a volume of to-be-transmitted data of a third terminal device with a highest priority in the set of third terminal devices; and based on the volume of the to-be-transmitted data being greater than or equal to a fourth preset value, configuring a dynamic analog beam of the third terminal device only for the third terminal device.

15. The communications device according to claim 14, wherein the processor is further configured to execute the program to facilitate the following being performed by the communications device:

based on the volume of the to-be-transmitted data being less than the fourth preset value, and the set of third terminal devices comprising at least two third terminal devices, determining that the at least two third terminal devices in the set of third terminal devices share the dynamic analog beam of the third terminal device with the highest priority.

* * * * *

UNITED STATES PATENT AND TRADEMARK OFFICE
CERTIFICATE OF CORRECTION

PATENT NO. : 12,082,233 B2  
APPLICATION NO. : 17/698036  
DATED : September 3, 2024  
INVENTOR(S) : Zhu et al.

Page 1 of 1

It is certified that error appears in the above-identified patent and that said Letters Patent is hereby corrected as shown below:

In the Claims

Claim 10: Column 23, Line 30: "the set of second terminal device." should read as -- the set of second terminal devices. --.

Signed and Sealed this
Sixth Day of May, 2025

Coke Morgan Stewart
*Acting Director of the United States Patent and Trademark Office*